United States Patent
Seitz et al.

(10) Patent No.: US 7,632,076 B2
(45) Date of Patent: Dec. 15, 2009

(54) AIR SUPPLY SYSTEM CONTROL

(75) Inventors: Sharon A. Seitz, Broadview Heights, OH (US); Roger L. Sweet, Berlin Heights, OH (US); William P. Amato, Avon, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 853 days.

(21) Appl. No.: 11/070,712

(22) Filed: Mar. 2, 2005

(65) Prior Publication Data

US 2006/0196168 A1    Sep. 7, 2006

(51) Int. Cl.
    F04B 35/00    (2006.01)
    F04B 49/06    (2006.01)
(52) U.S. Cl. .................... 417/1; 417/53; 417/364
(58) Field of Classification Search ............ 417/44.1, 417/313, 364, 1, 53
    See application file for complete search history.

(56) References Cited

U.S. PATENT DOCUMENTS

| | | | | |
|---|---|---|---|---|
| 3,906,717 | A | * | 9/1975 | Matthews ............... 60/39.08 |
| 4,667,465 | A | * | 5/1987 | Munk ..................... 60/39.3 |
| 5,592,754 | A | | 1/1997 | Krieder et al. |
| 5,832,725 | A | * | 11/1998 | Sim ........................ 60/289 |
| 5,885,060 | A | | 3/1999 | Cunkelman et al. |
| 5,906,480 | A | | 5/1999 | Sabelstrom |
| 6,036,449 | A | | 3/2000 | Nishar et al. |
| 6,062,026 | A | * | 5/2000 | Woollenweber et al. .... 60/605.2 |
| 6,120,107 | A | | 9/2000 | Eslinger |
| 6,308,517 | B1 | | 10/2001 | Fausten et al. |
| 6,681,171 | B2 | | 1/2004 | Rimnac et al. |
| 6,682,459 | B1 | | 1/2004 | Knight |
| 2004/0148932 | A1 | | 8/2004 | Larson |
| 2005/0025692 | A1 | * | 2/2005 | Becher et al. ............ 423/359 |
| 2006/0030450 | A1 | * | 2/2006 | Kyle ....................... 477/3 |

OTHER PUBLICATIONS

Article "Mitigating Carbon Deposits in Air Compressors", by Nicholas K. Petek, 5 pgs., Copyright 2003, SAE International.
Article "Electronic Compressor & Air Dryer Control", by Richard Conklin and Bill Hudgins, 7 pgs., Copyright 1999, Society of Automotive Engineers, Inc.
Brochure, "Bendix Service Data" SD-001-333, Tu-Flo 550 Compressor, 19 pgs., Copyright 2002, printed U.S.A.
Conklin, R et al, Electronic Compressor and Air Dryer Control, SAE Technical Paper Series, Nov. 15, 1999, pp. 107, Society of Automotive Engineers, Warrendale, PA, US.
PCT Written Opinion of the International Searching Authority on International Application PCT/US2006/000806, Aug. 15, 2006.
PCT International Search Report on International Application PCT/US2006/000806, Aug. 15, 2006.

* cited by examiner

*Primary Examiner*—Charles G Freay
(74) *Attorney, Agent, or Firm*—Calfee, Halter & Griswold LLP (57) ABSTRACT

Controlling one or more component of a vehicle air supply system, such as an air compressor or an air dryer, based on an engine control signal. Examples of engine control signals include emission control signals, turbocharger status signals, coolant temperature signals, and ambient temperature signals.

19 Claims, 6 Drawing Sheets

Figure 13 ical engines.
More particularly, the present invention relates to control of
vehicle air supply components, such as compressors and air
dryers, based on engine control signals

AIR SUPPLY SYSTEM CONTROL

FIELD OF THE INVENTION

The present disclosure relates generally to vehicle air supply systems that are powered by internal combustion engines. More particularly, the present invention relates to control of vehicle air supply components, such as compressors and air dryers, based on engine control signals

BACKGROUND OF THE INVENTION

Modern commercial vehicles contain air supply systems which are used to power air systems, such as service brakes, windshield wipers, air suspension, etc. Typical supply systems utilize an engine mounted and driven air compressor. The compressor delivers air to an air dryer. The air dryer filters, cools and dries the air. The air is delivered to one or more reservoirs. The systems draw the air from the one or more reservoirs.

Typically, the air supply system pressure is controlled by a pneumatic governor. The governor monitors the reservoir pressure, and uses air from the reservoir to signal the compressor and the air dryer. Typical air supply systems operate based solely on the reservoir pressure that is sensed by the regulator. When the system pressure falls below a lower predetermined value, such as 100 psi, the governer activates the compressor to begin increasing the pressure in the air system. The compressor builds air pressure until the air system pressure reaches an upper predetermined value, such as 125 psi.

U.S. Pat. No. 6,682,459 (herein "the '459 patent") assigned to the owner of the present invention discloses an electronic air charge controller for a commercial vehicle air brake system. The '459 patent discloses pausing the air compressor charging cycle when a high load condition is encountered. The '459 patent also discloses increasing engine speed when the vehicle is parked and the air supply is recharging to reduce the amount of time required to charge the air supply system. The '459 is incorporated herein by reference in its entirety.

Richard Conklin & Bill Hudgins, *Electronic Compressor & Air Dryer Control*, ASE 1999-01-3771 (1999) (herein "ASE article 1999-01-3771) contemplates electronic control of a pneumatic charging system of an air braked vehicle. ASE article 1999-01-3771 is incorporated herein by reference in its entirety.

SUMMARY

The present application relates to controlling one or more component of a vehicle air supply system based on an engine control signal. In one embodiment, a controller is used to control the air supply system based on engine control signals.

In one embodiment, engine emission control signals are monitored and an air compressor is controlled based on engine emission control signals. The engine emission control signals may be monitored to determine whether activating the compressor will cause engine emissions to exceed an emissions limit. The air compressor may be controlled to inhibit activation of the compressor when it is determined that activation of the compressor would cause engine emissions to exceed the emission limit. In one embodiment, the engine emission control signals may be monitored to determine an air quality, such as a compressor inlet air quality. For example, the engine emission control signals are monitored to determine an exhaust gas recirculation state. Inlet air that includes exhaust gasses may be inhibited from being compressed by the air compressor by inhibiting activation of the compressor when exhaust gasses are re-circulated.

In one embodiment, a state of a turbocharger is monitored. The air compressor is controlled based on the turbocharger state. For example, the air compressor may be activated when the turbocharger is activated to reduce the amount of work performed by the compressor.

In one embodiment, an engine coolant temperature is monitored. The air compressor is controlled based on the temperature of the coolant. For example, the compressor may be deactivated when the temperature of the coolant is above a selected temperature.

In one embodiment, a compressor air quality indicator is provided. In this embodiment, an attribute of air quality provided to a compressor is measured. The measured value of the air quality attribute is compared to a predetermined acceptable air quality range. An unacceptable air quality indicator is provided when the measured value is outside the acceptable air quality range. Instances when the measured value is outside the acceptable air quality range may be recorded. In one embodiment, the unacceptable air quality indicator is provided after the amount of time the measured air quality is outside the acceptable air quality range is more than a selected period of time.

In one embodiment, vehicle conditions are monitored to prevent excessive purge cycles in an air dryer. For example, an air dryer outlet air is measured for dew point. If the air dryer outlet air is below a predetermined dew point the dryer would not be purged on the next cycle.

Further advantages and benefits will become apparent to those skilled in the art after considering the following description and appended claims in conjunction with the accompanying drawings.

DETAILED DESCRIPTION

Figure 1:
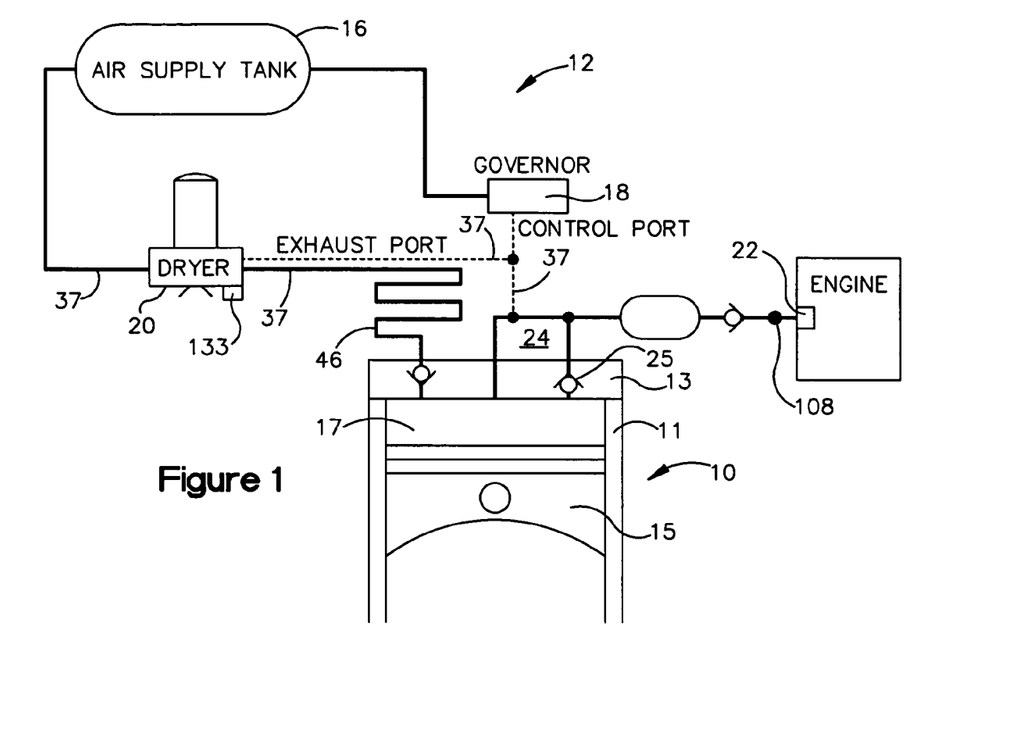
FIG. 1 is a schematic illustration of a vehicle air supply system.

The present invention is directed to controlling one or more components of a vehicle air supply system 12 based on engine control signals. The present invention can be implemented in a wide variety of different vehicle air supply systems. FIG. 1 illustrates an example of one such vehicle air supply system 12.

The illustrated air supply system 12 includes an air compressor 10, a reservoir 16, a governor 18, and an air dryer 20. The air compressor 10 includes a housing 11, a head 13, and a piston 15. The head 13 is mounted to the housing 11 such that the head and the housing define a compression chamber 17. The piston 15 reciprocates in the compression chamber 17 to compress air in the compression chamber in a known manner. The compressor 10 may be driven by a vehicle crank shaft (not shown). The compressor 10 receives air from an air source 22, such as an engine air intake. The compressor 10 compresses the air and provides the compressed air to the reservoir 16. In the air system illustrated by FIG. 1, the governor 18 places the compressor 10 in an activated or loaded state when the pressure in the reservoir 16 falls below a predetermined minimum pressure and places the compressor in a deactivated or unloaded state when the pressure in the reservoir reaches a predetermined maximum pressure. In the example illustrated by FIG. 1, the governor 18 places the compressor 10 in an unloaded state by providing an air signal to a compressor unloader 24. The compressor unloader may take a variety of different forms. For example, the unloader 24 may be a mechanism that holds an inlet valve 25 open or may be a separate valve assembly.

Figure 2:
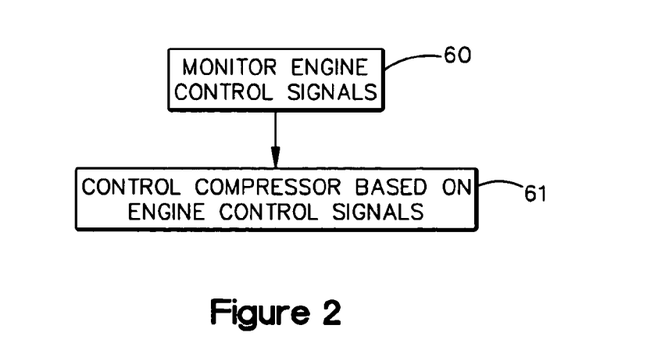
FIG. 2 is a flow chart that illustrates a method of controlling an air compressor based on engine control signals.

FIG. 2 illustrates a method of controlling the air compressor 10 based on engine control signals. According to the method illustrated by FIG. 2, engine control signals are monitored 60. The compressor 10 is controlled 61 based on the control signals.

Engine control signals include signals from sensors that monitor the status of engine related components and signals that control engine related components. Examples of engine control signals include emission control signals, turbocharger status signals, coolant temperature signals, ambient temperature signals, throttle positions signals, engine load signals, engine brake status signals, engine revolutions per minute, intake manifold pressure signals, and vehicle speed signals, Examples of engine emission control signals include current exhaust emissions signals, air quality signals, and exhaust gas recirculation signals.

Figure 3:
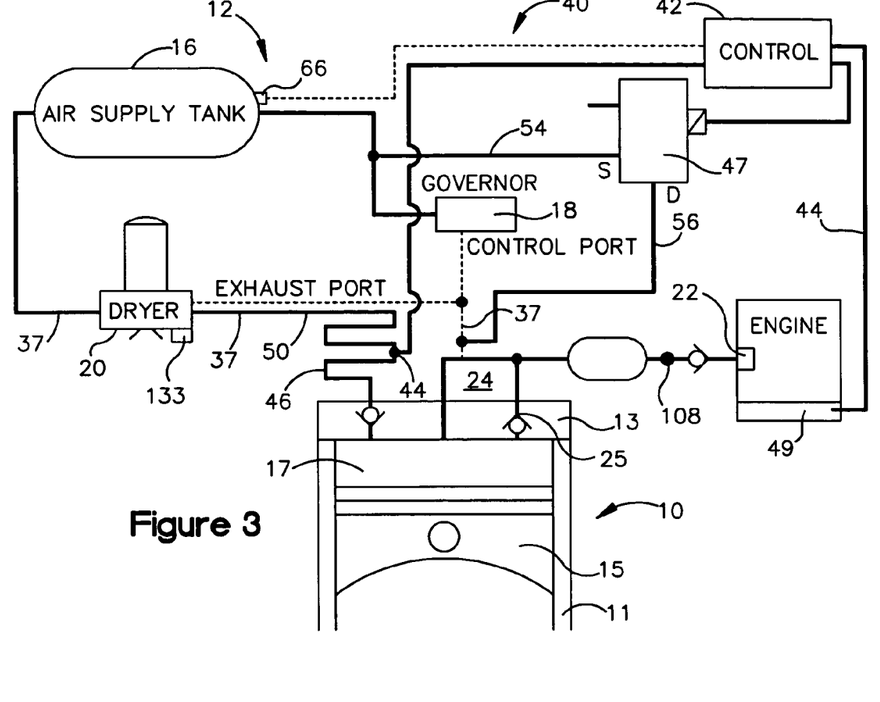
FIG. 3 is a schematic illustration of a vehicle air supply system adapted for control based on engine control signals.

FIGS. 3-6 illustrate examples of vehicle air supply systems 12 adapted for control based on engine control signals. FIG. 3 illustrates a compressor control circuit 40 that controls a compressor 10 in an air supply system 12 based on one or more engine control signals. The illustrated control circuit 40 includes a controller 42, an engine control signal link 44, and a control valve 47. The engine control signal link 44 receives control signals from an engine control unit 49. The engine control signal link 44 can take a variety of different forms. In one embodiment, the engine control signal link comprises a J1939 link to a tractor bus.

Referring to FIG. 3, the illustrated control valve 47 includes an inlet 54 that is coupled to the reservoir 16 and an outlet that is coupled to the unloader 24. The controller 42 controls the control valve 47 to selectively communicate an air signal from the reservoir 16 to the unloader to selectively deactivate the compressor 10. For example, the controller may open the control valve to provide the air signal to the unloader to place the compressor in an unloaded state. The controller may close the control valve to allow the compressor to be placed in an loaded state. In one embodiment, the control valve is a solenoid controlled valve.

In the illustrated embodiment, the path from the reservoir 16, through the control valve 47, to the unloader 24 is parallel to the path from the reservoir 16, through the governor 18, to the unloader. As a result, the control valve 46 may operate to bypass the governor 18 and deactivate the compressor 10 based on the engine control signals provided to the controller 42 over the engine control signal link 44. In the exemplary embodiment, the controller is programmed based on the particular engine that the compressor is assembled with and the type of vehicle that the engine is assembled in to optimize compressor performance.

Figure 4:
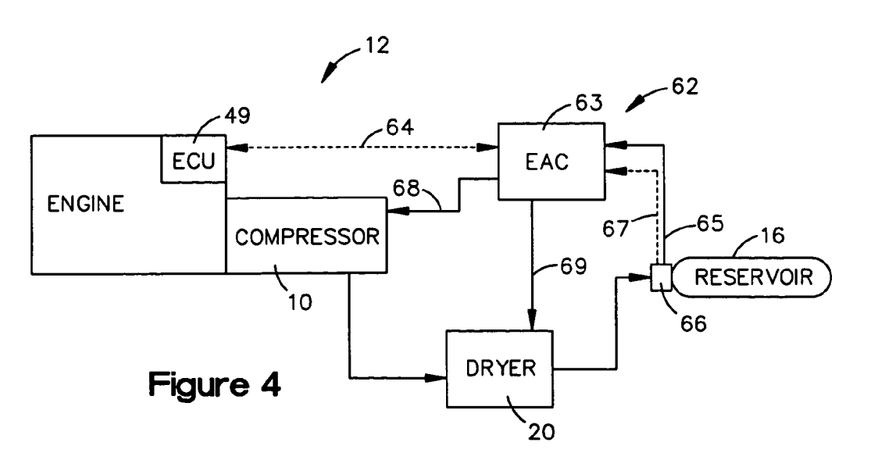
FIG. 4 is a schematic illustration of a vehicle air supply system adapted for control based on engine control signals.

The air supply control circuit 62 illustrated by FIG. 4 controls the compressor 10 and/or the air dryer 20 based on one or more engine control signals. The control circuit 62 illustrated by FIG. 4 includes an air system controller 63, and an engine control signal link 64. In the embodiment illustrated by FIG. 4, the air system controller 62 replaces the governor that is included in conventional air supply systems. The engine control signal link 64 provides control signals from an engine control unit 49 to the controller 63. In the example of FIG. 4, pressurized air is provided to the controller 63 by the reservoir 16 through line 65. A pressure sensor 66 provides pressure signals from the reservoir 16 to the controller 63 over a communication link 67. The controller 63 is coupled to the compressor 10 by pneumatic signal line 68. The controller 63 is coupled to the dryer 20 by a pneumatic signal line 69. In the example of FIG. 4, the controller 63 controls the compressor 10 and/or the dryer 20 by selectively providing pneumatic signals to the compressor 10 and/or the dryer 20 based on the engine control signals and/or the pressure signals. For example, the controller may provide an air signal to the compressor to place the compressor in an unloaded state. In the exemplary embodiment, the controller is programmed based on the particular engine that the compressor is assembled with and the type of vehicle that the engine is assembled in to optimize compressor performance.

Figure 5:
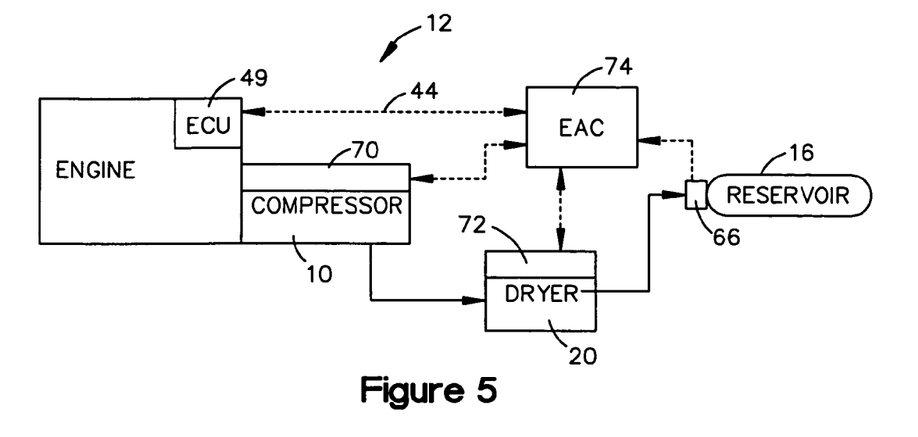
FIG. 5 is a schematic illustration of a vehicle air supply system adapted for control based on engine control signals.

The air supply control system 12 illustrated by FIG. 5 controls the compressor 10 and/or the air dryer 20 based on one or more engine control signals. In the example of FIG. 5, the compressor 10 includes an electronic interface 70 and the dryer 20 includes an electronic interface 72. An air supply system controller 74 is in communication with the engine control unit 49, the compressor electronic interface 70, the dryer electronic interface 72, and a reservoir pressure sensor 66. The compressor electronic interface 70 allows the compressor 10 to be controlled by the controller 74. The dryer electronic interface 72 allows the dryer 20 to be controlled by the controller 74. The communication between the controller 74 and the electronic interfaces 70, 72 eliminates the need for pressurized air to be provided to the air system controller or to an air system control valve from the reservoir. The communication between the controller 74 and the electronic interfaces 70, 72 also eliminates the need for the pneumatic control signal lines that extend from an air system controller 74 or an air system control valve to the compressor and the dryer. In the example of FIG. 5, the controller 76 controls the compressor 10 and/or the dryer 20 by selectively providing communication signals to the compressor 10 and/or the dryer 20 based on the engine control signals and/or the pressure signals. For example, the controller 76 may provide an electrical control signal to the compressor electronic interface 70 to place the compressor 10 in an unloaded state. In the exemplary embodiment, the controller is programmed based on the particular engine that the compressor is assembled with and the type of vehicle that the engine is assembled in to optimize compressor performance.

Figure 6:
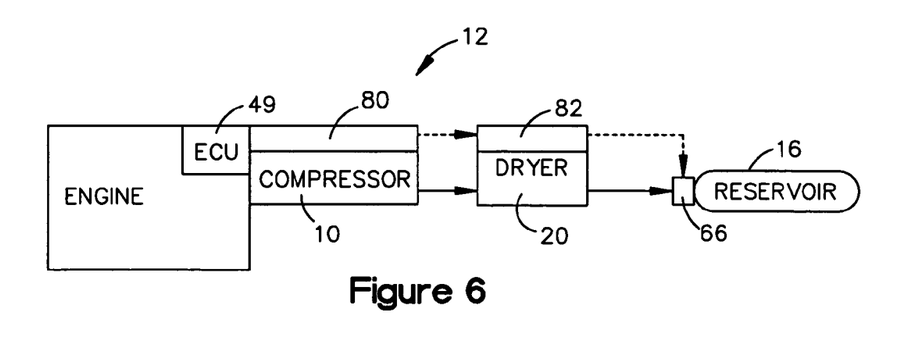
FIG. 6 is a schematic illustration of a vehicle air supply system adapted for control based on engine control signals.

The air supply control system 12 illustrated by FIG. 6 controls the compressor 10 and/or the air dryer 20 based on one or more engine control signals. In the example of FIG. 6, the engine control unit 49 is programmed to control the air supply system 12. That is, the functionality of an air system controller is integrated into the engine control unit 49. In the example of FIG. 6, the compressor 10 includes an electronic interface 80 and the dryer 20 includes an electronic interface 82. The engine control unit 49 is in communication with the compressor electronic interface 80, the dryer electronic interface 82, and a reservoir pressure sensor 66. For example, the compressor electronic interface 80, the dryer electronic interface 82, and/or the pressure sensor 66 may be linked to the vehicle bus The compressor electronic interface 80 allows the compressor 10 to be controlled by the engine controller 49. The dryer electronic interface 72 allows the dryer 20 to be controlled by the engine controller 49. In the example of FIG. 6, the engine controller 49 controls the compressor 10 and/or the dryer 20 by selectively providing communication signals to the compressor 10 and/or the dryer 20 based on the engine control signals and/or the pressure signals.

Figure 7:
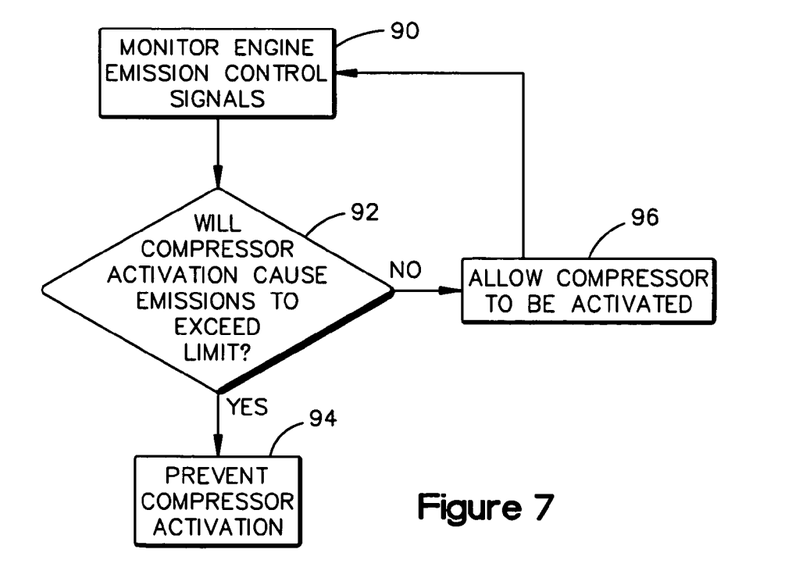
FIG. 7 is a flow chart that illustrates a method of controlling an air compressor based on engine emission control signals.

The air supply system can be controlled based on a wide variety of different engine control signals. FIGS. 7-11 are flow charts that illustrate algorithms for controlling components of the air supply system based on engine control signals. In the example of FIG. 7, engine emission control signals are monitored 90. The engine emission control signals are analyzed to determine 92 whether activating the compressor will cause engine emissions to exceed an emission limit. For example, emissions may be sensed at an exhaust manifold and an increase in emissions caused by activating the compressor may be estimated. If the increase of emissions would cause the emissions to exceed the emissions limit, the compressor is prevented 94 from being activated. If activating the compressor would not cause the emissions limit to be violated, the compressor is allowed 96 to be activated.

Figure 8:
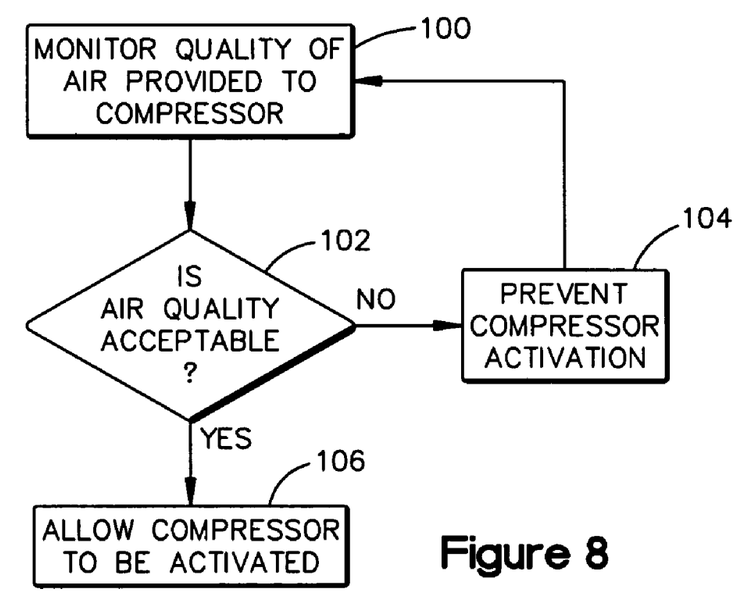
FIG. 8 is a flow chart that illustrates a method of controlling an air compressor based on air quality.

In the example of FIG. 8, engine emission air quality signals are monitored 100. For example, signals that are indicative of the quality of the air that will be provided to the compressor are monitored. The air quality signals are analyzed to determine 102 whether the air quality is acceptable for compression by the air compressor. Poor air quality could reduce the life of the compressor. If the quality of the air that will be provided to the compressor is not acceptable, the compressor is prevented 104 from being activated. If the quality of the air that will be provided to the compressor, the compressor is allowed 106 to be activated.

Air quality may be monitored in a variety of different ways. In one embodiment, an air quality sensor 108 (FIG. 3) is included in the vehicle air intake. In one embodiment, a compressor air quality indicator is provided to the vehicle operator and/or service technician. The sensor 108 measures an air quality attribute of air provided to the compressor. The measured air quality attribute value is compared to a predetermined acceptable air quality range. An unacceptable air quality indicator is provided when the measured value is outside the acceptable air quality range. Instances when the measured air quality attribute value is outside the acceptable air quality range may be recorded and an amount of time the measured value is outside the acceptable air quality range may be logged. In one embodiment, the unacceptable air quality indicator is provided after the measured value is outside the acceptable air quality range for more than a predetermined period of time.

Some engines includes exhaust gas recirculation systems. Exhaust gas recirculation systems re-circulate a small portion of the exhaust gas back to the engine air intake under certain conditions to reduce emissions. In one embodiment, air quality is determined by monitoring whether exhaust gasses are being re-circulated to the engine air intake. In one embodiment, the compressor is prevented from being activated if exhaust gasses are being re-circulated to the engine air intake. The compressor is allowed to be activated if exhaust gasses are not being re-circulated to the engine air intake.

Figure 9:
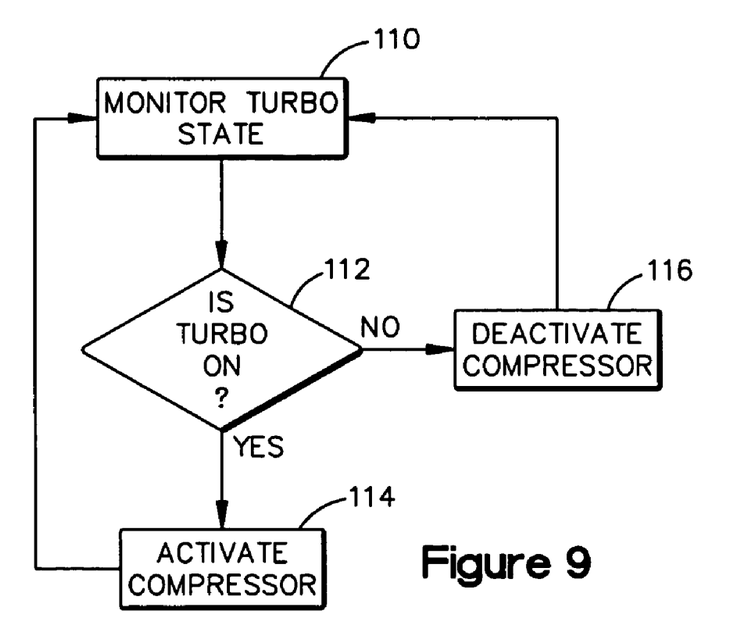
FIG. 9 is a flow chart that illustrates a method of controlling an air compressor based on an engine turbo state.

In the example of FIG. 9, a state of an engine intake air turbocharger is monitored 110. For example, the state of the turbocharger may be whether the turbocharger is operating in a high pressure mode or a low pressure mode. In this example, if the turbocharger provides a boost that is above a predetermined value, the turbocharger is in the high pressure mode. If the boost is below the predetermined value, the turbocharger is in the low pressure mode. In the example of FIG. 9, it is determined 112 whether the turbocharger is in the high pressure mode or the low pressure moded. In this example, the compressor is activated 114 if the turbocharger is in the high pressure mode and the compressor is deactivated 116 if the if the turbocharger is operating in the low pressure mode. When the turbocharger is in the high pressure mode, the intake air provided to the compressor is pressurized above atmospheric pressure. As a result, the amount of work performed by the compressor, and thus the engine that drives the compressor, is reduced when the turbocharger is operating in the high pressure mode.

In one embodiment, the state (activated or deactivated) of the compressor 10 is communicated to the engine controller 49. For example, the state of the compressor may be communicated to the engine controller 49 by one of the disclosed compressor controllers. This communication informs the engine controller that the compressor is using some of the intake air. The intake air that is used by the compressor will not be provided to the combustion chamber for burning fuel. The engine controller 49 controls the air-fuel mixture to account for the air compressor state.

Figure 10:
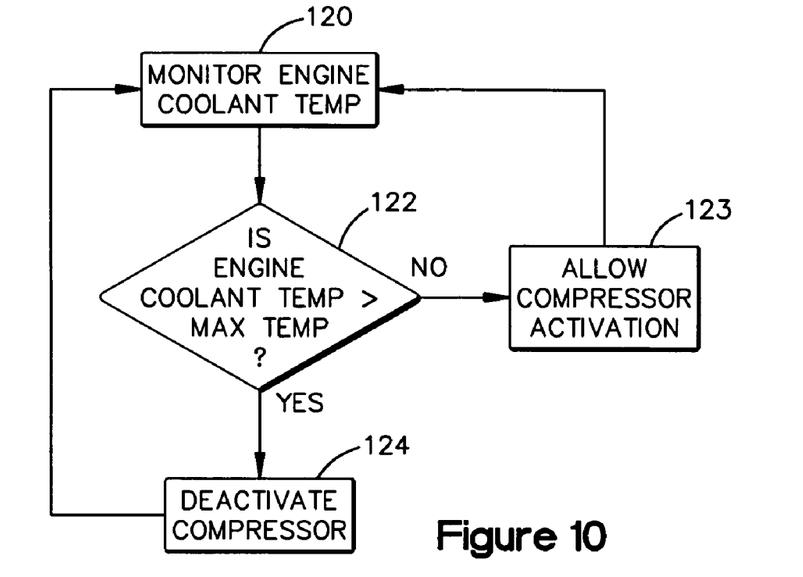
FIG. 10 is a flow chart that illustrates a method of controlling an air compressor based on coolant temperatures.

In the example of FIG. 10, an engine coolant temperature is monitored 120 to determine 122 whether the coolant temperature is above a predetermined desired temperature limit for the compressor 10. In this example, the compressor is allowed 123 to be activated if the coolant temperature is below desired temperature limit for the compressor 10. The compressor is prevented 124 from being activated if the coolant temperature is above the desired temperature limit for the compressor 10. In many applications, the compressor 10 is cooled by engine coolant. Operating the compressor when the coolant is relatively cool reduces the operating temperature of the compressor and may prolong the life of the compressor.

Figure 11:
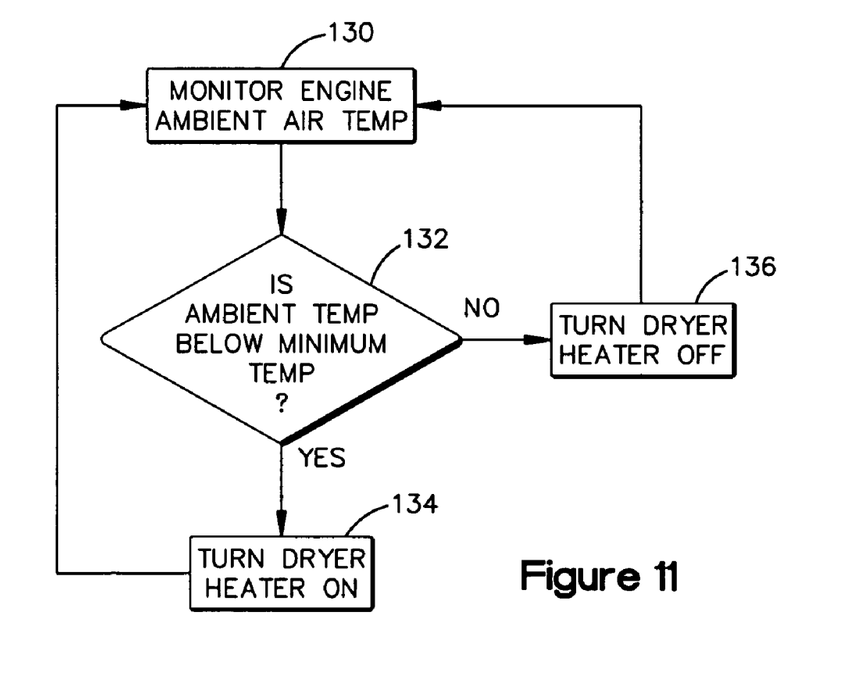
FIG. 11 is a flow chart that illustrates a method of controlling an dryer heater based on a dryer inlet temperature.

In the example of FIG. 11, ambient air temperature is monitored 130 to determine 132 whether the ambient air temperature is below a predetermined desired temperature limit for the dryer 20. In this example, a dryer heater 133 (FIG. 1) is turned on 134 if the ambient temperature is below desired temperature lower limit for the dryer 20. The dryer heater 133 is turned off 136 if the ambient temperature is above the desired temperature lower limit for the dryer 20. In one embodiment, the heater is turned on and off based on a dryer inlet air temperature rather than the ambient air temperature. Heating the dryer 20 prevents freezing of liquid in the air dryer.

Figure 12:
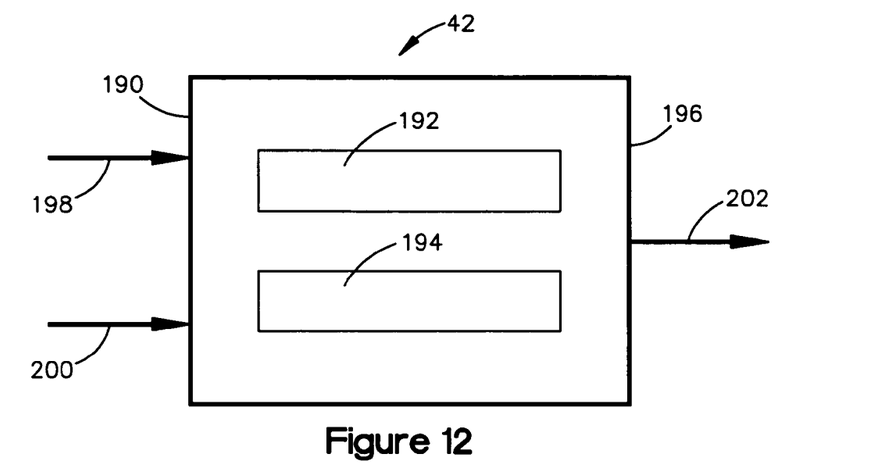
FIG. 12 is a schematic illustration of a compressor controller.

FIG. 12 is a schematic illustration of a controller 42 that can be used to control the compressor based on engine control signals. For example, the controller could be used to perform the methods illustrated by FIGS. 2 and 7-11, combinations of the methods illustrated by FIGS. 7-11, and combinations of control methods performed by traditional governor control systems (activate at lower threshold pressure, deactivate at upper threshold pressure) and the methods illustrated by FIGS. 7-11). The controller 42 illustrated in the example of FIG. 12 includes an input 190, memory 192, a processor 194, and an output 196. The input 190 receives engine control signals 198 and/or reservoir pressure signals 200. The memory 192 stores a compressor control algorithm and predetermined values, such as upper and lower control values The processor 194 applies the compressor control algorithm to the engine control signals 198 and/or the reservoir pressure signals 200 to produce output signals 202. The output signals 202 control the air supply system. Examples of output signals 202 include an air compressor activation signal that causes the compressor to be activated and an air compressor deactivation signal that causes the compressor to be deactivated.

Figure 13:
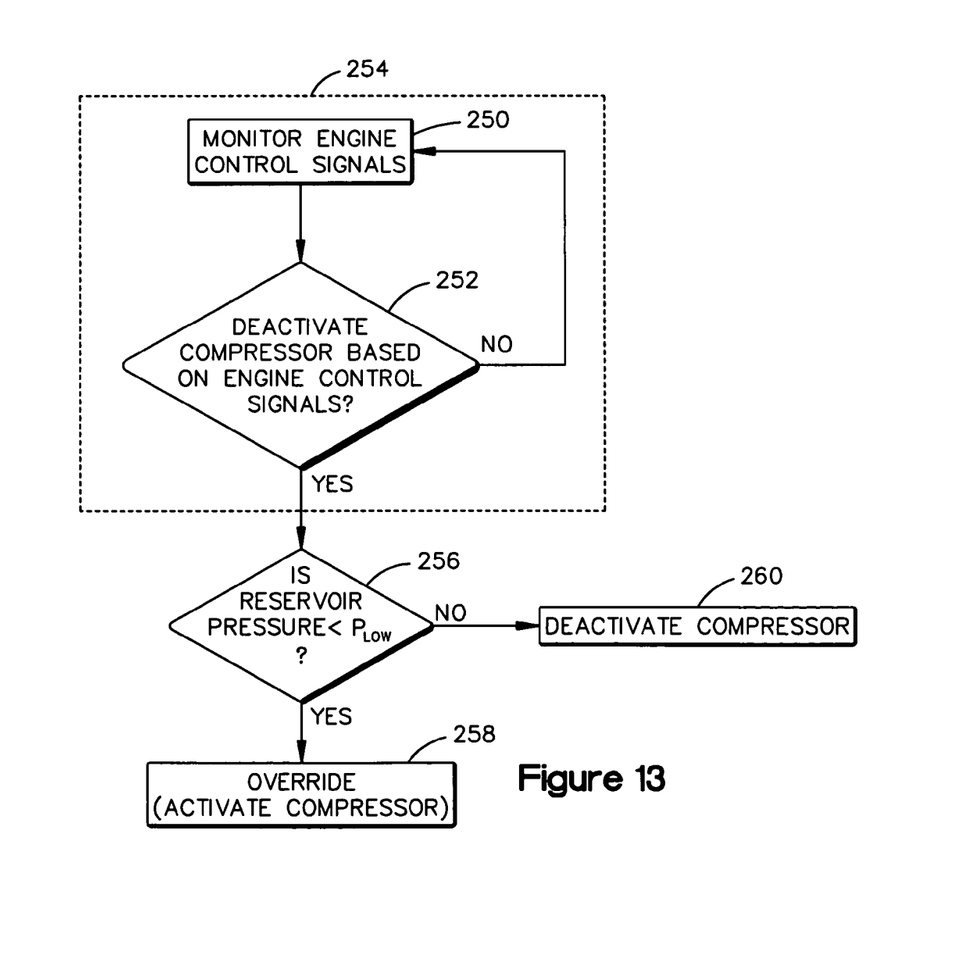
FIG. 13 is a flow chart that illustrates a method of controlling an air compressor based on engine control signals with a low air pressure override.

FIG. 13 illustrates a method of controlling an air compressor based on engine control signals with a low air pressure override. In the embodiment illustrated by FIG. 13, engine control signals are monitored 250 to determine 252 whether the compressor should be deactivated. The engine control signal based portion 254 of the flow chart illustrated by FIG. 13 may comprise one or more of the methods illustrated by FIGS. 2 and 7-11. If the compressor is set to a deactivated state by an engine control signal based algorithm 254, the method determines 256 whether the air supply system pressure is below a minimum threshold pressure, such as 100 psi. If the system pressure is below the minimum pressure, the engine control signal based algorithm is overridden 258 (i.e. the compressor is activated). If the system pressure is above the minimum pressure, the compressor is set 260 to a deactivated state. In the exemplary embodiment, the compressor is deactivated when an upper pressure limit is reached.

While the invention has been described with reference to specific embodiments, it will be apparent to those skilled in the art that may alternatives, modifications, and variations may be made. Accordingly, the present invention is intended to embrace all such alternatives, modifications, and variations that may fall within the spirit and scope of the appended claims.

The invention claimed is:

1. A method of controlling an air compressor, comprising:
   a) monitoring engine control signals, wherein the engine control signals are selected from the group consisting of engine emission control signals, turbocharger state signals, and coolant temperature signals;
   b) controlling the air compressor based on the engine control signals;
   c) wherein the engine control signals comprise engine emission control signals; and
   d) wherein the engine emission control signals are monitored to determine whether activating the compressor will cause engine emissions to exceed an emission limit and the air compressor is controlled to inhibit activation of the compressor when it is determined that activation of the compressor would cause engine emissions to exceed the emission limit.

2. The method of claim 1 wherein the engine emission control signals are indicative of an inlet air quality and the air compressor is controlled based on the inlet air quality.

3. The method of claim 1 wherein the engine emission control signals are monitored to determine an exhaust gas recirculation state and the air compressor is controlled based on the exhaust gas recirculation state.

4. The method of claim 3 wherein intake air that includes exhaust gasses are inhibited from being compressed by the air compressor.

5. The method of claim 3 wherein activation of the compressor is inhibited when exhaust gasses are re-circulated to the engine air intake.

6. The method of claim 1 wherein the engine control signals comprise turbocharger state signals.

7. The method of claim 6 wherein the compressor is activated when the engine control signals indicate that the turbocharger is operating in a high pressure mode.

8. The method of claim 7 further comprising controlling an engine air-fuel mixture based on an air compressor state.

9. The method of claim 1 wherein the engine control signals comprise coolant temperature signals.

10. The method of claim 9 wherein the compressor is deactivated when a temperature indicated by the coolant temperature signal is above a selected temperature.

11. An air compressor controller, comprising:
    a) an input for receiving engine control signals;
    b) a memory for storing a compressor control algorithm;
    c) a processor for applying the compressor control algorithm to the engine control signals, wherein the processor provides air compressor activation and deactivation signals based on the engine control signals and determines whether activating the compressor will cause engine emissions to exceed an emission limit; and
    d) an output for communicating the compressor activation and deactivation signals to control the compressor, wherein the output communicates a compressor deactivation signal when the processor determines that activation of the compressor would cause engine emissions to exceed the emission limit.

12. The air compressor controller of claim 11 wherein the engine control signals are selected from the group consisting of engine emission control signals, turbocharger state signals and coolant temperature signals.

13. The controller of claim 12 wherein the processor determines whether exhaust gasses are being re-circulated and the output provides a compressor deactivation signal when the processor determines that exhaust gasses are being re-circulated.

14. The controller of claim 11 wherein the engine control signals comprise engine coolant temperature signals.

15. The air compressor controller of claim 14 wherein the output provides a compressor deactivation signal when the processor determines that a temperature indicated by the coolant temperature signal is above a selected temperature.

16. The air compressor controller of claim 11 wherein the engine control signals comprise turbocharger state signals.

17. The air compressor controller of claim 11 wherein the air compressor controller is in communication with an engine control unit that monitors the engine control signals to control an associated vehicle engine, the air compressor controller receiving engine control signals from the engine control unit and the air compressor controller controlling an associated air compressor based on the engine control signals.

18. The air compressor controller of claim 17 wherein the air compressor controller provides compressor activation state signals to the engine control unit.

19. The air compressor controller of claim 18 wherein the compressor control signals are used by the engine control unit to determine an engine air-fuel mixture based on the air compressor activation state.

* * * * *

UNITED STATES PATENT AND TRADEMARK OFFICE
CERTIFICATE OF CORRECTION

PATENT NO. : 7,632,076 B2  Page 1 of 1
APPLICATION NO. : 11/070712
DATED : December 15, 2009
INVENTOR(S) : Seitz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1323 days.

Signed and Sealed this

Second Day of November, 2010

David J. Kappos
*Director of the United States Patent and Trademark Office*